United States Patent [19]

Nakata

[11] 4,447,044

[45] May 8, 1984

[54] CLUTCHING AND BRAKING CONTROL FOR HYDRAULICALLY DRIVEN CRANE WINCHES

[75] Inventor: Minoru Nakata, Komatsu, Japan

[73] Assignee: Kabushiki Kaisha Komatsu Seisakusho, Tokyo, Japan

[21] Appl. No.: 267,356

[22] Filed: May 26, 1981

[30] Foreign Application Priority Data

May 26, 1980 [JP] Japan .................. 55-69017

[51] Int. Cl.³ .................. B66D 1/14; B66D 5/08; B66D 5/26

[52] U.S. Cl. .................. 254/309; 192/17 A; 254/310; 254/315; 254/322; 254/347; 254/370

[58] Field of Search .............. 254/309, 310, 315, 321, 254/322, 347, 349, 350, 351, 361, 370; 192/12, 17 A, 18 A

[56] References Cited

U.S. PATENT DOCUMENTS

| | | | |
|---|---|---|---|
| 3,780,990 | 12/1973 | Edlund et al. | 254/361 |
| 3,871,714 | 3/1975 | Behrend | 254/361 |
| 4,088,305 | 5/1978 | Wineburner et al. | 192/12 B |
| 4,185,520 | 1/1980 | Henneman et al. | 74/750 R |
| 4,312,497 | 1/1982 | Whaley | 254/351 |

FOREIGN PATENT DOCUMENTS 45-34028 12/1970 Japan .
52-54116 12/1977 Japan .
54-24579 8/1979 Japan .

*Primary Examiner*—Billy S. Taylor
*Attorney, Agent, or Firm*—Armstrong, Nikaido, Marmelstein & Kubovcik

[57] ABSTRACT

A control system for one or more hydraulically driven crane winch drums each having a hydraulically actuated clutch and a brake. Included is a negative braking mechanism having a brake cylinder of the single-acting, spring-return type for normally holding the brake applied by the force of the spring and releasing the brake on fluid pressure actuation. A mode selector valve selectively delivers hydraulic fluid under pressure from two separate sources to the clutch and the brake cylinder in order to condition the winch for a selected one of winching, brake-locking, and free-fall modes. The mode selector valve causes the negative braking mechanism to release the brake in the free-fall mode, so that a positive braking mechanism is also provided to permit the operator to arrest the free fall of the load, or the free running-out of the cable, in an exact position desired.

9 Claims, 4 Drawing Figures

CLUTCHING AND BRAKING CONTROL FOR HYDRAULICALLY DRIVEN CRANE WINCHES

BACKGROUND OF THE INVENTION

This invention relates to a control system for hydraulically driven crane winches of the type having a drum provided with a hydraulically actuated clutch and brake. More specifically the invention pertains to such a control system for selectively actuating the clutch and brake of the drum in order to condition the winch for a selected one of several operating modes.

The hydraulic crane winch system has been known and used extensively wherein one or more winch drums are driven by a combination of hydraulic pump and motor. Each winch drum is normally provided with a hydraulic clutch for connection and disconnection of the drum to and from the hydraulic motor, and a brake for arresting or retarding the rotation of the drum. For the actuation of the clutch it has been customary to employ an operator-controlled valve, separate from a motor control valve, directing hydraulic fluid under pressure into the clutch cylinder for the engagement of the clutch. The mechanism for the actuation of the brake, on the other hand, has been either "positive" or "negative".

By the positive braking mechanism is meant the one whereby the operator can himself apply the brake as by the depression of a brake pedal. Such manual braking offers an advantage as when the drum clutch is disengaged to allow the free fall of the load or the free running-out of the load cable, because the operator can make proper braking control of the drum to stop the load or its suspension device in an exact position desired. The positive braking mechanism presents a hazard, however, as the operator may fail to apply the brake when, with the clutch disengaged, the winch drum is to be brake-locked against rotation.

The noted disadvantage of the positive braking mechanism is absent from the negative braking mechanism, which automatically applies the brake upon disengagement of the drum clutch or upon setting of the drum drive motor in neutral. The negative braking mechanism has its own drawback, however. It includes a brake cylinder of the single-acting, spring-return type, normally holding the brake applied by the force of the spring and releasing the brake upon reception of hydraulic fluid under pressure from the pump of the drum drive system. Consequently, when the drum drive motor is not rotating, the brake is held applied to lock the drum against rotation. Upon disengagement of the clutch for free fall the brake must be released by introducing pressurized fluid into the brake cylinder against the effect of the return spring.

Heretofore, for thus releasing the brake, the brake cylinder has been set out of communication with the circuit of the drum drive motor, and the desired pressurized fluid for actuation of the brake cylinder has been obtained from a pedal-operated master cylinder. Such braking control by hydraulic fluid inevitably incurs time lag, making it difficult to arrest free fall in a desired position. The brake release by depression of the pedal coupled to the master cylinder is also objectionable because it runs counter to the usual braking action by pedaling and so may lead to erroneous operation.

A further problem with the conventional winch control system arises from the presence of too many controls to be manipulated, such as the lever for setting the drum drive motor into and out of forward or reverse rotation, the lever for the on-off control of the drum clutch, and the pedal for the application or release of the drum brake. The operator must actuate these controls in various combinations to obtain a desired mode of operation, so that he must be skilled enough to avoid errors in operation. For example, if the control system includes a positive braking mechanism, the brake pedal should be depressed immediately upon disengagement of the clutch for free fall; otherwise, the load or suspension device would fall too rapidly. Such too rapid fall will also take place with a control system incorporating a negative braking mechanism, if the operator makes an error in the sequence of actuating the brake pedal and clutch lever. He may also erroneously operate the motor control lever when the clutch lever is on, giving rise to unexpected movement of the load or suspension device.

SUMMARY OF THE INVENTION

The present invention seeks to materially simplify the operation and control of hydraulic crane winches of the class under consideration. The invention also seeks to make combined use of both positive and negative braking mechanisms in a manner well calculated to derive advantages therefrom and to cancel their drawbacks.

According to one aspect of the invention there is provided a control system for a hydraulically driven crane winch of the type having at least one winch drum equipped with a hydraulically actuated clutch and a brake. The control system comprises two sources of hydraulic fluid under pressure and both positive and negative braking mechanisms for manual and automatic actuation of the brake. Also included is a mode selector valve for selectively delivering the pressurized fluid from the two sources to the clutch and to the brake cylinder of the negative braking mechanism in order to condition the winch for a selected one of several operating modes.

In a preferred embodiment one of the pressurized fluid sources is the pump for driving the bidirectional hydraulic motor to be connected to and disconnected from the winch drum by the clutch, and the other is an accumulator in communication with the pump. The mode selector valve is a three-position directional control valve, movable among a first position for setting the winch in a winching mode by engaging the clutch and releasing the brake, a second position for setting the winch in a brake-locking mode by disengaging the clutch and applying the brake, and a third position for setting the winch in a free-fall mode by disengaging the clutch and releasing the brake. More specifically the mode selector valve communicates the brake cylinder and the clutch with the pump and the accumulator, respectively, when in the winching position, communicates both the brake cylinder and the clutch with a fluid drain when in the brake-locking position, and communicates the brake cylinder with the accumulator and communicates the clutch with the fluid drain when in the free-fall position.

Thus, according to the invention, the crane winch can be conditioned for any desired one of the winching, brake-locking, and free-fall modes by actuation of the mode selector valve only. Another important feature of the invention is the provision of the positive braking mechanism in addition to the negative braking mechanism. The mode selector valve directs pressurized fluid toward the brake cylinder of the negative braking mechanism not only in the winching mode but also in the free-fall mode, the pressurized fluid being supplied from the pump during the winching mode and from the accumulator during the free-fall mode. As the negative braking mechanism automatically releases the brake when the mode selector valve is shifted to the free-fall position, the free fall of the load or the free running-out of the load cable can be easily and accurately controlled by the positive braking mechanism, which may include a pedal to be depressed for braking like the usual brake pedal.

It is also noteworthy that the conventional braking control of free fall by the negative braking mechanism has been possible only when the winch is unloaded. The present invention defeats this limitation and makes possible the positive braking control of the free fall of the load meeting the force with which the brake pedal is depressed.

The above and other features and advantages of this invention will become more apparent, and the invention itself will best be understood, from the following description and appended claims taken together with the attached drawings.

DESCRIPTION OF THE PREFERRED EMBODIMENT

Figure 1:
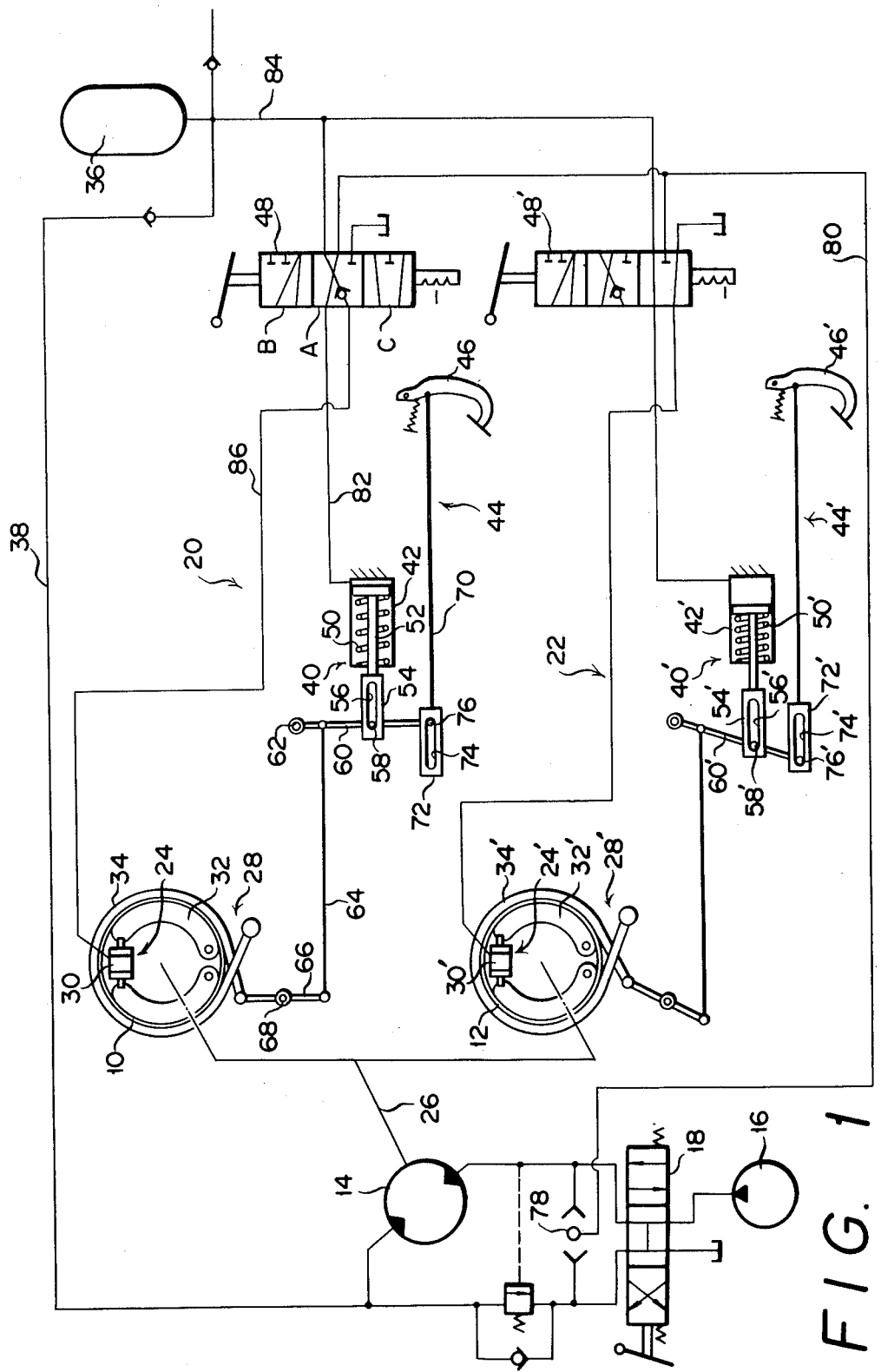
FIG. 1 is a schematic diagram of a preferred form of the crane winch control system according to this invention.

FIG. 1 shows the present invention as adapted for a crane winch system having two winch drums 10 and 12, both driven from a bidirectional hydraulic motor 14. A fixed displacement hydraulic pump 16 delivers fluid under pressure to the drum motor 14 via a three-position drum control valve 18. In its central position the drum control valve 18 communicates the pump 16 with a fluid drain and, when shifted to either of its two offset positions, places the pump in communication with the corresponding one of the two inlet ports of the drum motor 14 thereby setting the motor into rotation in a desired direction.

The two winch drums 10 and 12 and their clutching and braking control systems 20 and 22 are both of identical design, so that only the drum 10 and its associated control system 20 will be described in detail, it being understood that the same description applies to the other winch drum 12 and its control system 22. The means provided to the winch drum 12 and the constituent parts or components of its control system 22 will be identified merely by priming the reference numerals used to denote the corresponding means, parts or components of the winch drum 10 and its control system 20.

The representative winch drum 10 has a clutch 24 for connecting and disconnecting the drum to and from the output shaft 26 of the drum motor 14, and a brake 28 for arresting or retarding the rotation of the drum. Itself of conventional make, the clutch 24 comprises a single-acting hydraulic cylinder 30 and a pair of clutch shoes 32. The brake 28 itself is also of the known type having a band 34 wrapped around the drum 10. These clutch 24 and brake 28 are to be controlled by the system 20 for various modes of operation hereinafter set forth.

What follows, then, is the discussion of the representative clutching and braking control system 20. It should be noted, first of all, that the two control systems 20 and 22 share two sources of hydraulic fluid under pressure. One of these is the pump 16 driving the drum motor 14. The other is an accumulator 36 in communication with at least the pump 16 by way of a line 38 and the drum control valve 18. The use of an accumulator as the second source of pressurized fluids is of course not mandatory; another pump could be employed as well, as in the case of a truck crane.

The clutching and braking control system 20 comprises:

1. A negative braking mechanism 40 including a brake cylinder 42 for automatically actuating the brake 28.

2. A positive braking mechanism 44 including a brake pedal 46 for permitting the operator to apply the brake 28 when it is released by the negative braking mechanism 40.

3. A mode selector valve 48 for controlling communication between the two pressurized fluid sources 16 and 36 and the clutch cylinder 30 and brake cylinder 42 in order to condition the winch for any selected operating mode.

The brake cylinder 42 included in the negative braking mechanism 40 is of the single-acting, spring-return type, normally holding the brake 28 applied by the force of the return spring 50. The piston rod 52 of the brake cylinder 42 is secured to a coupling member 54 having formed therein a slot 56 extending in the longitudinal direction of the piston rod. Slidably engaged in the slot 56 is a pin 58 formed on a lever 60 intermediate its ends. Pivotally supported at one end 62, this lever 60 is connected via linkage 64 to one end of another lever 66, which is connected at the other end to the brake band 34 and pivoted at its midpoint 68.

The brake pedal 46 of the positive braking mechanism 44 is connected via linkage 70 to a coupling member 72 having formed therein a slot 74 extending approximately parallel to the slot 56 in the coupling member 54. Slidably engaged in this slot 74 is a pin 76 on the free end of the lever 60.

In the absence of pressure in the fluid chamber of the brake cylinder 42, as in the state in which the representative control system 20 is depicted in FIG. 1, the pin 58 on the lever 60 is at the left hand end, as viewed in this figure, of the slot 56 in the coupling member 54, whereas the other pin 76 on the lever 60 is at the right hand end of the slot 74 in the coupling member 72. The lever 60 is now urged in a counterclockwise direction under the bias of the brake cylinder return spring 50. Since then the other lever 66 is also forced in a counterclockwise direction, the brake band 34 is tightened to arrest the rotation of the winch drum 10.

The other control system 22 is shown in FIG. 1 in a state wherein pressurized fluid is introduced into the brake cylinder 42' against the force of the return spring 50'. The consequent extension of the brake cylinder 42' in the negative braking mechanism 40' permits the lever 60' to turn in a clockwise direction, resulting in the loosening of the brake band 34'. The pin 76' on the lever 60' slides along the slot 74' in the coupling member 72' during its clockwise turn, so that the negative braking mechanism on actuation can release the brake without being hampered by the positive braking mechanism. If then the brake pedal 46' is depressed to positively apply the brake, the lever 60' is turned counterclockwise, with the pin 58' sliding along the slot 56' in the coupling member 54', to tighten the brake band. It is thus seen that the negative and positive braking mechanism 40 and 44, as well as 40' and 44', can act independently, without interfering with each other.

The construction of the mode selector valve 48 (and 48') is shown in detail in FIG. 2, so that only its functional features will be explained in connection with FIG. 1. The mode selector valve is a three-position, five-port one. In its first or central position A the valve communicates the pump 16 with the brake cylinder 42 by way of the drum control valve 18, a shuttle valve 78, a first supply line 80, and a brake control line 82. The valve 48 in its first position also communicates the accumulator 36 with the clutch cylinder 30 by way of a second supply line 84 and a clutch control line 86. The shuttle valve 78 is connected in parallel with the drum motor 14, and the first supply line 80 is connected to this shuttle valve in such a way that the pressurized fluid from the pump 16 flows into the first supply line only when the drum control valve 18 is in either of its two offset positions to permit communication between pump and drum motor.

Thus, although the mode selector valve 48 is shown in its first position, nevertheless the brake cylinder 42 is shown contracted since the drum control valve 18 is shown in its neutral central position, blocking communication between drum motor 14 and pump 16. This is desirable because the brake 28 is automatically applied by the negative braking mechanism 40 whenever the drum motor 14 is set out of operation, regardless of the position of the mode selector valve 48. When the drum control valve 18 is in either of its offset positions, the mode selector valve 48 in its first position functions to cause engagement of the clutch 24 and release of the brake 28. The winch drum 10 is now set in the winching mode, for hoisting or lowering the load depending upon the direction in which it is driven by the drum motor 14.

When shifted to a second position B, the mode selector valve 48 blocks communication between the two pressurized fluid sources 16 and 36 and the clutch cylinder 30 and brake cylinder 42 and places the clutch and brake cylinders in communication with a fluid drain. Thereupon the winch drum 10 becomes disconnected from the motor 14 and locked against rotation by the negative braking mechanism 40. Thus set in the brake-locking mode, the winch drum can, for example, hold the load or the load suspension device suspended in the air.

When shifted to a third position C, the mode selector valve 48 communicates the brake cylinder 42 with the accumulator 36 and communicates the clutch cylinder 30 with the fluid drain. Then the clutch 24 is disengaged, and the brake 28 released, so that the winch drum 10 is conditioned for the free-fall mode, permitting the free fall of the load or the load suspension device.

As has been stated, in the conventional winch system with provisions for negative braking, the brake cylinder is discommunicated from the motor drive pump upon disengagement of the clutch. The brake is therefore applied automatically when the clutch is disengaged for free fall. Contrastively, according to the present invention, the mode selector valve 48 places the brake cylinder 42 in communication with the accumulator 36 when shifted to the third position C, thereby causing the negative braking mechanism to release the brake in the free-fall mode. The invention permits, instead, the positive application of the brake by the positive braking mechanism to accurately control the free fall of the load or the free running-out of the cable.

Figure 2:
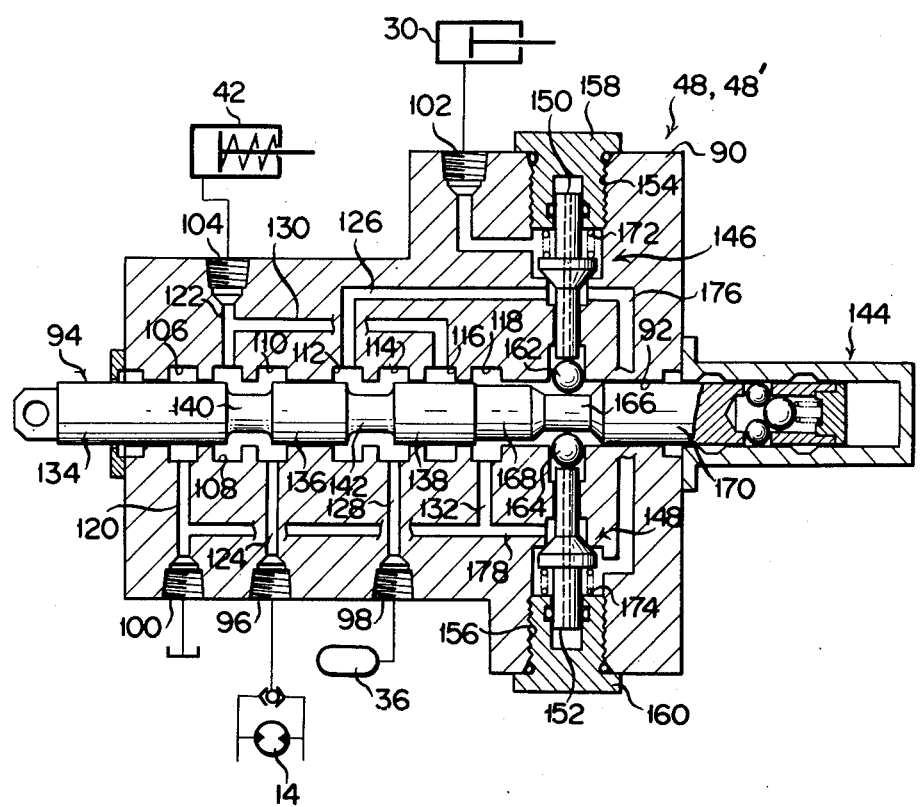
FIG. 2 is a sectional detail view of each mode selector valve used in the control system of FIG. 1, the valve being shown in its first or winching position.

FIG. 2 shows the detailed configuration of each mode selector valve 48 or 48'. Seen at 90 is a valve housing having a bore 92 extending centrally therethrough to slidably receive a spool 94. The housing 90 has the following five ports:

1. A first inlet port 96 in communication with the pump 16.
2. A second inlet port 98 in communication with the accumulator 36.
3. A drain port 100.
4. A first outlet port 102 in communication with the clutch cylinder 30.
5. A second outlet port 104 in communication with the brake cylinder 42.

The bore 92 receiving the spool 94 has several annular recesses which are designated, from left to right as seen in FIG. 2, 106, 108, 110, 112, 114, 116 and 118 respectively. The recess 106 communicates with the drain port 100 via a passage 120. The recess 108 communicates with the brake cylinder port 104 via a passage 122. The recess 110 communicates with the pump port 96 via a passage 124. The recess 112 communicates with the clutch cylinder port 102 via a passage 126. The recess 114 communicates with the accumulator port 98 via a passage 128. The recess 116 communicates with the brake cylinder port 104 via a passage 130 and the passage 122. The recess 118 communicates with the drain port 100 via a passage 132. All these recesses are adjustably covered and uncovered, as will be later explained in detail, by the spool 94 having lands 134, 136 and 138, with intervening grooves 140 and 142, and provided with a conventional detent mechanism 144.

Each mode selector valve is further provided with two check valves, one 146 for controlling communication between accumulator port 98 and clutch cylinder port 102 and another 148 for controlling communication between clutch cylinder port 102 and drain port 100. The check valves 146 and 148 include valve members 150 and 152 slidably fitted in stepped bores 154 and 156, respectively, which are formed in the valve housing 90 in rectilinear relationship to each other and at right angles with the bore 92 receiving the spool 94. Plugs 158 and 160 retain the check valve members 150 and 152 within the bores 154 and 156. Interposed between the check valve members 150 and 152 and the spool 94 are balls 162 and 164, respectively, which are engaged in a detent groove 166 in the spool 94 when the spool is in the first or central position as in FIG. 2. Upon displacement of the spool to the two offset positions, as in FIGS. 3 and 4, the balls ride on lands 168 and 170 on opposite sides of the detent groove 166 thereby displacing the check valve members 150 and 152 against the force of compression springs 172 and 174.

A bypass 176 extends between the two check valves 146 and 148 for communicating the clutch cylinder port 102 with a drain passage 178. When the spool 94 is in the illustrated central position, the check valve 146 functions to permit fluid flow from the outlet passage 126 to the clutch cylinder port 102, and the other check valve 148 functions to block communication between bypass 176 and drain passage 178. The check valves 146 and 148 are both deprived of their reverse blocking functions when the balls 162 and 164 ride on the land 168 or 170 of the spool 94.

In the operation of the mode selector valve 48 or 48', when the spool 94 is in the central position as shown in FIG. 2, the pressurized fluid from the pump 16 flows from the pump port 96 to the brake cylinder port 104 by way of the inlet passage 124, valve housing recesses 110 and 108, and outlet passage 122. The pressurized fluid from the brake cylinder port 104 enters the brake cylinder 42 thereby causing same to release the drum brake. The pressurized fluid from the accumulator 36, on the other hand, flows from the accumulator port 98 to the clutch cylinder port 102 by way of the inlet passage 128, recesses 114 and 112, and outlet passage 126 having the check valve 146. The check valve member 150 yields to the fluid pressure against the bias of the compression spring 172, permitting the fluid flow to the clutch cylinder port 102. On leaving the clutch cylinder port the pressurized fluid enters the clutch cylinder 30 to cause engagement of the drum clutch. The winch drum is thus conditioned for the winching mode, as has been explained with reference to FIG. 1.

Figure 3:
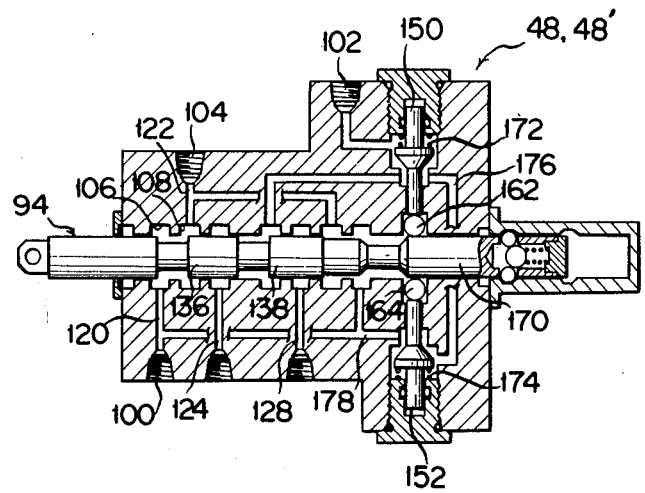
FIG. 3 is a similar view of the mode selector valve as shifted to a second or brake-locking position.

FIG. 3 shows the spool 94 of the mode selector valve 48 or 48' shifted leftward, to the second position B of FIG. 1. It will be noted that the spool 94 in this second position blocks both inlet passages 124 and 128 with its lands 136 and 138. No fluid pressure is therefore directed toward the clutch cylinder 30 or brake cylinder 42. The brake cylinder port 104 communicates instead with the drain port 100 by way of the passage 122, recesses 108 and 106 and passage 120, resulting in the contraction of the brake cylinder 42 and hence in the application of the drum brake. Moreover, as the balls 162 and 164 both ride on the spool land 170, the check valve members 150 and 152 are displaced against the bias of the compression springs 172 and 174 to permit communication of the clutch cylinder port 102 with the drain port 100 by way of the passages 176 and 178. Thus, with the brake applied and the clutch disengaged, the winch drum is conditioned for the brake-locking mode.

Figure 4:
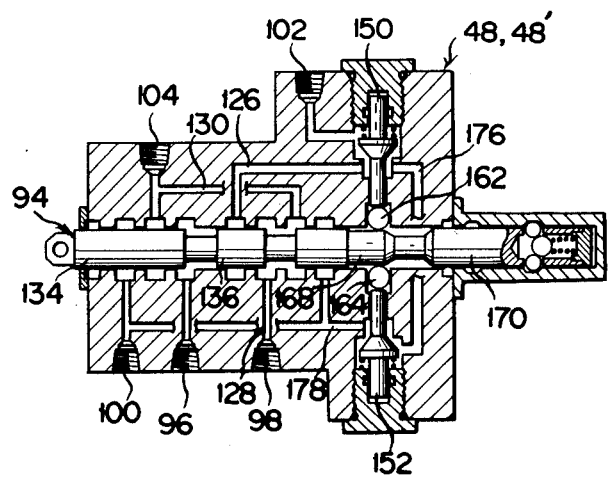
FIG. 4 is a similar view of the mode selector valve as shifted to a third or free-fall position.

In FIG. 4 is shown the mode selector valve with its spool 94 shifted rightward, to the third position C of FIG. 1. The spool 94 in this third position places the accumulator port 98 in communication with the brake cylinder port 104 by way of the inlet passage 128, recesses 114 and 116, and outlet passage 130. The brake cylinder 42 releases the brake on fluid pressure actuation. The pump port 96, on the other hand, is blocked as the spool lands 134 and 136 cover the outlet passages 122 and 126. Further, as the balls 162 and 164 both ride on the spool land 168, the check valve members 150 and 152 are displaced against the bias of the compression springs to permit communication of the clutch cylinder port 102 with the drain port 100 by way of the passages 176 and 178. Since then the clutch is disengaged, and the brake released, the winch drum is conditioned for free fall.

It is thus seen that the invention makes possible the clutching and braking control of the hydraulic crane winch by the single mode selector valve, practically eliminating the possibility of errors in setting the winch in a desired mode of operation. The manipulation of two such mode selector valves for a dual drum winch system is also made materially easier than heretofore.

Although the control system of this invention has been shown and described as adapted for a two-drum crane winch system, it is of course understood that the invention has equal validity in connection with a single winch drum. Further, since a variety of modifications, variations or adaptations of the invention will readily occur to one skilled in the art, it is not desired to limit the invention to the exact details of this disclosure but to comprehend all equivalances falling within the purview of the following claims.

What is claimed is:

1. A control system for a hydraulically driven crane winch of the type having a drum provided with a hydraulically actuated clutch and a brake, the control system comprising:
    (a) a first source and a second source of hydraulic fluid under pressure;
    (b) a negative braking mechanism means for automatically actuating a brake, the negative braking mechanism means including a brake cylinder;
    (c) hydraulic connecting means including a mode selector valve means movable to at least three positions for selectively delivering the pressurized fluid from said two sources to the clutch and to the brake cylinder in order to condition respectively the winch for a selected one of at least three operating modes consisting of (1) a winching mode wherein said clutch is engaged and said brake is disengaged with respect to said drum, (2) a brake-locking mode and (3) a free-fall mode wherein said clutch and brake are disengaged with respect to said drum; and
    (d) a positive braking mechanism for permitting an operator to selectively apply the brake whenever said mode selector valve means is in that one of the at least three positions which effects operating in the free-fall mode, and the brake is released by the negative braking mechanism.

2. The control system of claim 1, including a fluid drain and wherein said first source comprises a pump and said second source comprises an accumulator, and said mode selector valve means has a first position for effecting communication between said pump and said brake cylinder, and between said accumulator and the clutch to engage the clutch and to release the brake, a second position for effecting communication between said fluid drain and each of said brake cylinder and the clutch to disengage the clutch and to apply the brake, and a third position for effecting communication between said brake cylinder and said accumulator, and between said fluid drain and the clutch to engage the clutch and to release the brake.

3. The control system of claim 2, including a spring, and wherein said brake cylinder is a single-acting, spring-return brake cylinder, normally holding the brake by force of said spring and releasing the brake upon fluid pressure actuation, and wherein said mode selector valve means communicates said brake cylinder and said clutch with said first and said second sources of pressurized fluid, respectively, when in a first position, communicates said brake cylinder and the clutch with said fluid drain when in a second position, and communicates said brake cylinder with said second source of pressurized fluid and communicates the clutch with said fluid drain when in the third position.

4. The control system of claim 3, including a hydraulic motor, and wherein said first source of pressurized fluid is said pump which is an hydraulic pump supplying pressurized fluid to said hydraulic motor for driving the drum.

5. The control system of claim 4, wherein the second source of pressurized fluid is said accumulator in communication with said hydraulic pump.

6. The control system of claim 5, wherein said mode selector valve means has mounted therein check valve means for permitting fluid flow only in a direction from said second source toward the clutch when said mode selector valve means is in the first position, said check valve means being displaceable to permit fluid flow from the clutch to said drain when said mode selector valve means is moved to the second and third positions.

7. The control system of claim 6, wherein said check valve means comprises:
   (a) a first check valve for controlling communication between said second pressurized fluid source and the clutch; and
   (b) a second check valve for controlling communication between the clutch and said fluid drain.

8. An improved winch system including a pump, a bidirectional hydraulic motor, at least one drum, a hydraulically actuated clutch for connecting and disconnecting the drum to and from the bidirectional hydraulic motor driven by the pump, and a brake for arresting or retarding rotation of the drum, the improvement comprising:
   (a) an additional source of hydraulic fluid under pressure;
   (b) a negative braking mechanism for automatically actuating said brake, said negative braking mechanism including a spring and a brake cylinder, said brake cylinder being a single-acting, spring-return brake cylinder for normally holding said brake applied by force of said spring and releasing said brake on fluid pressure actuation;
   (c) a fluid drain;
   (d) a three-position mode selector valve means for communicating said brake cylinder and said clutch with said pump and said additional source of pressurized fluid, respectively, when in a first position, for communicating said brake cylinder and said clutch with said fluid drain when in a second position, and for communicating said brake cylinder with said additional source of pressurized fluid and communicating said clutch with said fluid drain when in a third position; and
   (e) positive braking means for permitting an operator to apply said brake whenever said mode selector valve means is in the third position.

9. An improved winch system according to claim 8, wherein said hydraulic motor has two inlet ports, and further comprising:
   (a) a drum control valve for selectively communicating said pump with either of said two inlet ports of said motor and with said fluid drain; and
   (b) a shuttle valve connected in parallel with the motor;
   (c) said mode selector valve means communicating with said pump via said shuttle valve and said drum control valve, to effect flow of pressurized fluid from said pump to said mode selector valve means only when said drum control valve places said pump in communication with either of said inlet ports of said motor.

* * * * *